(12) United States Patent
Amthor et al.

(10) Patent No.: US 12,372,770 B2
(45) Date of Patent: Jul. 29, 2025

(54) METHOD OF PREPARING A MICROSCOPE FOR IMAGING A SAMPLE

(71) Applicant: Carl Zeiss Microscopy GmbH, Jena (DE)

(72) Inventors: Manuel Amthor, Jena (DE); Daniel Haase, Zoellnitz (DE); Thomas Ohrt, Golmsdorf (DE)

(73) Assignee: Carl Zeiss Microscopy GmbH (DE)

( * ) Notice: Subject to any disclaimer, the term of this patent is extended or adjusted under 35 U.S.C. 154(b) by 0 days.

(21) Appl. No.: 17/088,479

(22) Filed: Nov. 3, 2020

(65) Prior Publication Data
US 2021/0132358 A1 May 6, 2021

(30) Foreign Application Priority Data
Nov. 4, 2019 (DE) .......................... 102019129695.1

(51) Int. Cl.
G02B 21/36 (2006.01)
G02B 27/00 (2006.01)
G02B 21/06 (2006.01)

(52) U.S. Cl.
CPC ....... G02B 21/365 (2013.01); G02B 27/0025 (2013.01); *G02B 21/06* (2013.01)

(58) Field of Classification Search
CPC ... G02B 21/365; G02B 27/0025; G02B 21/06
See application file for complete search history.

(56) References Cited

U.S. PATENT DOCUMENTS 7,825,360 B2    11/2010  Karasawa et al.
8,053,711 B2 *  11/2011  Fomitchov ......... G02B 27/0068
                                            250/201.3

(Continued)

FOREIGN PATENT DOCUMENTS

DE    102014102080 A1    8/2015
DE    102017011463 A1    6/2018
DE    102017105926       9/2018
JP    H0738798 A         2/1995

OTHER PUBLICATIONS

"Convolutional neural network," Wikipedia. pp. 1-28 [Retrieved from "https://en.wikipedia.org/w/index.php?title=Convolutional_neural_network&oldid=976664110"] Sep. 4, 2020.

(Continued)

*Primary Examiner* — James T Boylan
(74) *Attorney, Agent, or Firm* — Bradley J. Thorson

(57) ABSTRACT

A method for preparing a microscope for imaging a sample. The method includes the following steps: providing the microscope for imaging the sample, wherein the microscope comprises an objective having a motor-adjustable objective correction ring for correcting imaging aberrations; acquiring sample information comprising at least one of the following indications: thickness of a cover glass, material of the cover glass, sample temperature, sample type, sample location on a sample carrier, embedding medium of the sample, or immersion medium; imaging the sample using the microscope for generating at least one raw image of the sample with a first setting of the objective correction ring; and inputting the at least one raw image and the sample information into a machine algorithm and determining a second setting of the objective correction ring, which reduces the imaging aberrations vis à vis the first setting, by means of the algorithm on the basis of the raw image and the sample information.

20 Claims, 2 Drawing Sheets

(56) References Cited

U.S. PATENT DOCUMENTS

| | | | | |
|---|---|---|---|---|
| 2011/0139980 | A1* | 6/2011 | Nakano | H01J 37/153 250/307 |
| 2014/0152794 | A1* | 6/2014 | Takahashi | G06V 20/693 348/79 |
| 2015/0253562 | A1* | 9/2015 | Kues | G02B 21/367 348/79 |
| 2018/0172983 | A1 | 6/2018 | Maeda | |
| 2018/0191948 | A1 | 7/2018 | Zheng | |
| 2018/0267300 | A1* | 9/2018 | Goegler | G02B 21/025 |
| 2018/0287300 | A1 | 9/2018 | Goegler et al. | |
| 2019/0122378 | A1* | 4/2019 | Aswin | G06N 3/045 |
| 2019/0311482 | A1* | 10/2019 | Newby | G06N 20/00 |
| 2020/0249455 | A1* | 8/2020 | Chan | G02B 21/245 |
| 2020/0382715 | A1* | 12/2020 | Hong | H04N 5/232125 |
| 2021/0286972 | A1* | 9/2021 | Lin | G01N 23/2251 |
| 2022/0051373 | A1* | 2/2022 | Kappel | G06N 3/08 |

OTHER PUBLICATIONS

"Deep learning," Wikipedia, pp. 1-32 [Retrieved from "https://en.wikipedia.org/w/index.php?title=Deep_learning&oldid=975606067"] Aug. 29, 2020.

"Machine learning," Wikipedia, pp. 1-22 [Retrieved from "https://en.wikipedia.org/w/index.php?title=Machine_learning&oldid=976600218"] Sep. 3, 2020.

"Q-learning," Wikipedia, pp. 1-7 [Retrieved from "https://en.wikipedia.org/w/index.php?title=Q-learning&oldid=974049683"] Aug. 20, 2020.

Reinforcement learning, Wikipedia, pp. 1-12 [Retrieved from "https://en.wikipedia.org/w/index.php?title=Reinforcement_learning&oldid=976038269"] Aug. 31, 2020.

Supervised learning, Wikipedia, pp. 1-8 [ Retrieved from "https://en.wikipedia.org/w/index.php?title=Supervised_learning&oldid=973316580"] Aug. 16, 2020.

Sutton et al., "Reinforcement learning—An Introduction", 2nd Edition, MIT Press, Cambridge, MA, 2018, (available under http://incompleteideas.net/book/RLbook2018.pdf): Title page, Publication Page, table of contents, and pp. 23-44, 40 pgs total.

"Overview about Objectives for Research Microscopy" [Accessed at https://www.zeiss.com/microscopy/us/service-support/glossary/objectives-for-researchmicroscopy.html] 3 pgs total, Nov. 3, 2020.

"Education in Microscopy and Digital Imaging Interative Tutorials" [Accessed at http://zeiss-campus.magnet.fsu.edu/tutorials/basics/coverslipcorrection/indexflash.html] 2 pgs total, Nov. 3, 2020.

* cited by examiner

METHOD OF PREPARING A MICROSCOPE FOR IMAGING A SAMPLE

RELATED APPLICATION

The present application claims the benefit of German Application No. DE 102019129695.1, filed Nov. 4, 2019, said application being hereby incorporated herein in its entirety by reference.

TECHNICAL FIELD

The invention relates to a method for preparing a microscope for imaging a sample, wherein the microscope comprises an objective having an adjustable, in particular motor-adjustable, objective correction ring that serves for correcting imaging aberrations. The invention furthermore relates to a microscopy method.

BACKGROUND

Microscope objectives are designed such that they achieve optimum imaging results under specific optical conditions. As the resolution increases, the optical system of the microscope reacts increasingly more sensitively to deviations from the conditions on which the design is based. Image aberrations increase. Therefore, high-performance objectives, in particular immersion objectives, have a so-called correction ring, which acts optically on the objective and corrects spherical image aberrations, for example, which may result from deviations from the design conditions. Such deviations may be for example a varying cover glass thickness, a deviating sample temperature or temperature differences in the sample or differences in refractive index between an embedding medium and the immersion medium. A different depth position of the focal plane in the sample may also be such a deviation.

The optimum setting of such an objective correction ring is of great importance for high-resolution applications, in particular applications on living cells, because only then can the maximum resolution be achieved. Equally, it is also only then that the light sensitivity is optimal, which is of importance particularly during the microscopy of living cells with regard to reducing phototoxicity, i.e. the damaging influence of the illumination radiation, bleaching of fluorophores, etc. A further important application is in so-called multi-photon microscopy, in which high depth resolutions are achieved and, therefore, for three-dimensional recordings, a multiplicity of depth planes have to be arranged in a so-called z-stack. Since moreover the samples here usually comparatively have a high optical density and are also inhomogeneous, as a result image aberrations arise to a particularly disturbing extent.

For conveniently setting objective correction rings, as an alternative to manual actuation, motor-adjustable correction rings have been known for a relatively long time, which for example can be driven by a control device of the microscope and be set by the user by way of software.

The choice of the correct setting of the objective correction ring nevertheless remains problematic, particularly in the case of varying microscopic tasks and samples. In addition, the setting of the objective correction ring regularly changes an offset of the focus in the sample, which has to be compensated for by corresponding readjustment of the microscope.

SUMMARY

Therefore, the invention is based on the object of specifying a method for preparing a microscope for imaging a sample which allows a setting of the objective correction ring that is as optimal as possible to be determined in a simple manner.

The invention is defined in claims 1 and 10. Claims 2 to 9, and 11 to 18, relate to preferred developments.

For preparing a microscope for imaging a sample, firstly a microscope is provided, comprising an objective having an adjustable, in particular motor-adjustable, objective correction ring for correcting imaging aberrations. The sample is subsequently imaged using the microscope for generating at least one raw image of the sample with a first setting of the objective correction ring. The raw image is an electronic image. It is input into a predetermined machine learning or machine-learned algorithm, which then determines a second setting of the objective correction ring, which second setting reduces the imaging aberrations vis à vis the first setting. This is done on the basis of the raw image.

The algorithm used is either a machine learning algorithm or a machine-learned algorithm, that is to say is based on so-called machine learning in both cases. Technical realizations of such algorithms are known in the field of artificial intelligence and can for example be embodied as a neural network or comprise such a neural network. In the machine learning or machine-learned algorithm, the learning process relates to an assignment of raw images to correction ring settings. The machine-learned algorithm is able to derive from a raw image directly, generally without intermediate steps, how said raw image can be improved by a change in the correction ring setting. In this case, the change can be a relative indication, that is to say an alteration that has to be performed on the correction ring, or on an absolute correction ring setting, which is the case particularly if the algorithm knows the correction ring setting used for the raw image. Therefore, embodiments provide for that setting of the correction ring which is associated with the raw image also to be input into the algorithm in step c. The correction ring can be motorized, i.e. motor-adjustable. The provision of the information about the correction ring setting is then known as a result of the feedback of the drive or the previously set correction ring setting at the motor-based adjusting drive. Equally, however, the method is also able to be carried out with a purely manual correction ring adjustment by virtue of the fact that a user predefines a setting value for the correction ring, which the user then sets manually on the correction ring, or that the correction ring setting only associated with a raw image is read by a user and correspondingly fed to the algorithm.

The second setting in step d can optionally be obtained with further intermediate steps being carried out, in which provisional settings of the correction ring are determined and a raw image is generated in each case for said provisional settings. This is advantageously particularly for machine learning algorithms. In this case, finding the second setting can comprise an iterative process, in particular. This equally applies to the machine-learned algorithm.

The burden on a user is relieved during the preparation of the microscope in that, by means of artificial intelligence, a second and improved setting of the correction ring is derived from a raw image that was obtained with a first setting of the correction ring, wherein the artificial intelligence is realized by the machine-learned or machine learning algorithm. In this case, the machine-learned algorithm was trained on the basis of training data by way of supervised learning or reinforcement learning and is accordingly configured to derive a relative or absolute setting of the correction ring from the raw image and thus to obtain the second setting. A machine learning algorithm likewise obtains the second setting, in preferred embodiments using an iterative sequence with a plurality of intermediate positions, in each of which a figure of merit is evaluated.

The algorithm carries out so-called machine learning. Said machine learning simulates the settings of the objective correction ring which are performed by a human expert on the basis of the latter's experience. In this case, in the prior art, the image quality of the raw image is usually assessed and the human expert would incorporate previous experience with similar objectives, samples and application circumstances and also further knowledge, namely the sample information. This intrinsically human procedure is automated by machine learning. The basic principles of machine learning are presented for example at https://en.wikipedia.org/wiki/Machine_learning.

In principle, various types of machine learning are possible, inter alia so-called reinforcement learning, described e.g. at https://en.wikipedia.org/wiki/Reinforcement_learning, and supervised learning, described at https://en.wikipedia.org/wiki/Supervised_learning.

With regard to reinforcement learning, reference is also made to the publication R. Sutton and A. Barto, "Reinforcement Learning: An Introduction", 2nd edition, MIT Press, Cambridge, MA, 2018. The section starting from page 2, in particular, delimits the various types of machine learning from one another. The publication explains the differences between the various types of learning. Reinforcement learning differs from supervised learning. In supervised learning, training data classified by an expert are provided. The system is taught on the basis of these training data, such that it can carry out a correct extrapolation for other data as well. In unsupervised learning, the system learns to find structures in non-classified data. Reinforcement learning differs from both, even though reinforcement learning is considered to be a subtype of unsupervised learning in some publications in the literature. The publication cited explains, however, that reinforcement learning does not find hidden structures, but rather maximizes a merit or reward function. In the publication cited, therefore, reinforcement learning is classified as a third learning type of machine learning.

In embodiments, the algorithm carries out a plurality of substeps in the step for determining the second setting. A first step involves determining a figure of merit for the raw image. In this case, e.g. a predefined quality criterion is taken as a basis. Alternatively, an approach using neural networks (see below) is possible. The figure of merit is used virtually as a reward or punishment in a subsequent iteration for the algorithm, that is to say ultimately for assessing whether or not an improvement in the setting of the objective correction ring was achieved in the iteration. The objective correction ring is then adjusted to a changed setting. This can be done either by simulation or during renewed imaging of the sample. The following steps are subsequently carried out iteratively: An image of the sample is determined for the changed setting of the objective correction ring. This is done, of course, according to the adjustment in turn in a simulation or from the imaging of the sample. Next, a current figure of merit is generated for this image. A check is then made to ascertain whether the current figure of merit attained a minimum value (e.g. a minimum improvement vis à vis the last figure of merit). If this is the case, the setting of the objective correction ring that was determined last was sufficient and is used as the second setting. The iteration has then finished. If the current figure of merit fails to attain the minimum value, the objective correction ring is adjusted once again. This in turn takes place, of course, in the simulation or for renewed imaging of the sample. The adjustment is optionally effected in the same direction as the last adjustment if the current figure of merit was an improvement vis à vis the previous figure of merit. If it was a deterioration, optionally the objective correction ring is adjusted in the opposite direction, preferably beyond the penultimate setting of the objective correction ring. The iteration is then continued, i.e. once again an image of the sample is determined with the currently changed setting of the objective correction ring—in turn either in simulation or by imaging of the sample. As a result of this iteration, the algorithm ultimately obtains the second setting, which is an improvement vis à vis the first setting. Depending on the predefinition of the minimum value, said second setting is then even very close to the theoretical optimum or even reaches it.

The figure of merit can be based on a quality criterion. The latter can comprise at least one of the following image properties: Imaging sharpness, signal/noise ratio, presence, frequency or extent of predetermined artefacts, recognizability of predetermined structures. Supplementarily or alternatively, it is possible for the algorithm to comprise a neural network, which assesses the image quality and, in particular, determines the figure of merit. Such a neural network is expediently trained beforehand to differentiate good images from bad images. Therefore, it does not have to explicitly define a figure of merit geared to one of the image properties mentioned, but rather generates a figure of merit which is sufficient for the algorithm as reward or punishment, i.e. for the decision as to whether the current setting of the objective correction ring constitutes an improvement.

In the case of supervised learning, the figure of merit represents for example a classification of whether the setting of the objective correction ring is okay or not okay, and the direction in which it deviates, if appropriate. The objective correction ring can then be adjusted on the basis of a model that determines an improved value for the setting of the objective correction ring. The model can use a regression, for example, in order to predict the optimum value or the necessarily alteration of the setting of the objective correction ring.

As already outlined, the algorithm can either carry out a sequence of renewed imagings of the sample with different settings of the objective correction ring or else use a simulation. Such a simulation uses an image synthesis, for example, in order to obtain the image of the sample for the changed setting of the objective correction ring. Said image synthesis can also be effected from an image-to-image mapping, that is to say that from an image actually obtained, namely the raw image, an alteration is determined synthetically on the basis of the changed setting of the objective correction ring and the further image is obtained in this way.

Optionally, sample information is acquired and used by the algorithm in order to determine the second setting. The sample information comprises at least one of the following executions: Thickness of a cover glass, material of the cover glass, sample temperature, sample type, sample location on a sample carrier, embedding medium of the sample, immersion liquid. In this case, the cover glass is that layer of glass which is situated between sample and objective. Consequently, this need not necessarily be a cover glass in the conventional sense; rather, in the case of microscopy effected through the sample carrier, the latter is the "cover glass" in the sense understood above. Said sample information is taken into account by the algorithm when it determines the second setting.

In embodiments, it is expedient to provide the point spread function for the microscope, such that the algorithm evaluates said point spread function. This can be the two-dimensional point spread function or is optionally the three-dimensional point spread function. Particularly preferably, the dependence of the point spread function on the setting of the objective correction ring is known.

The method for preparing the microscope preferably proceeds fully automatically by the algorithm being carried out by a control device of the microscope and the objective correction ring also being set to the second setting by said control device. Fully automatic operation is thus possible which prepares the microscope in such a way that the second setting of the objective correction ring simultaneously brings about the optimum correction of imaging aberrations within the scope of the predefinitions. The method can of course be triggered manually by a user. Equally, it is possible to initiate the method automatically, for example when a change of sample is recognized, when a change of objective is recognized, or when it is recognized that the image quality deviates from a predefined minimum value or from the optimum to an excessively great extent.

The method for preparing a microscope for imaging a sample can furthermore be part of a method for examining a sample by microscopy, wherein the microscope is prepared as explained above and the sample is subsequently imaged using the second setting of the objective correction ring.

As becomes clear from the explanations above, the second setting of the objective correction ring is generally not the second setting which is actually performed after the first setting used for the raw image. Rather, the term second setting relates to that setting which was determined by the algorithm for optimization. It goes without saying that many adjustments of the objective correction ring may occur here in the course of carrying out the algorithm. In other words, the term "second setting" should not be understood in the sense of a count of the settings.

It is understood that the features specified above and the features yet to be explained below can be used not only in the specified combinations, but also in other combinations or on their own, without departing from the scope of the present invention.

DESCRIPTION OF THE DRAWINGS

The invention is explained in even more detail below on the basis of exemplary embodiments, with reference being made to the appended drawings, which likewise disclose features essential to the invention. These exemplary embodiments are only illustrative and should not be construed as restrictive. By way of example, a description of an exemplary embodiment with a multiplicity of elements or components should not be construed as meaning that all of these elements or components are necessary for implementation. Rather, other exemplary embodiments can also contain alternative elements and components, fewer elements or components or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times. In the figures.

DETAILED DESCRIPTION

Figure 1:
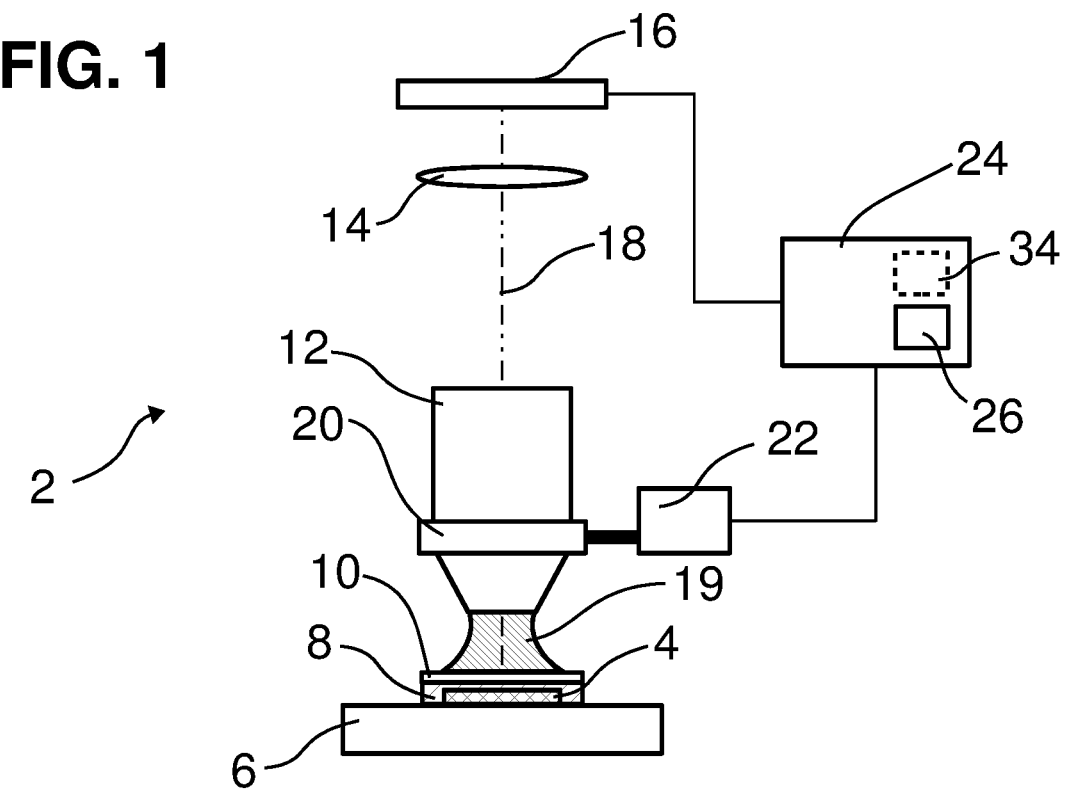
FIG. 1 shows a schematic illustration of a microscope which, for imaging a sample, comprises an objective having an objective correction ring.

FIG. 1 schematically shows a microscope 2, which is used for imaging a sample 4. The sample 4 is situated on a sample carrier 6 and is embedded into an embedding medium 8 beneath a cover glass 10. Sample 4, sample carrier 6 and embedding medium 8 as well as cover glass 10 are not part of the microscope, but are regularly present during the imaging of a sample. The microscope 2 images the sample 8 onto an detector 16 along an optical axis 18 by means of an objective 12 and a tube lens 14. In this case, an immersion medium 19, usually embodied as a fluid, is generally situated between the end of the objective 12 and the cover glass 10. Said immersion medium increases the optical resolution since the numerical aperture increases as a result.

The objective 12 is designed for specific conditions with regard to the sample and a specific focal position, in particular is optimized with regard to the spherical aberration. This design is not applicable to deviating conditions. For adaptation, the objective 12 therefore has a so-called correction ring 20, which changes the optical properties of the objective 12 in an adaptable manner, for example influences the spherical aberration. The correction ring 20 is actuated by a drive 22 controlled by an control device 24, which also reads out the image data of the detector 16, onto which the sample is imaged. The control device 24 comprises an input device or input interface 26, in particular. At the latter, in particular parameters concerning the sample such as have been explained in the general part of the description can be input into the control device 24.

For the optimum imaging of the sample 4, it is necessary to find an optimum setting of the correction ring 20. This constitutes a preparatory step before the actual microscopy of the sample 4. A corresponding method 28 is shown as a block diagram in FIG. 2.

An initial step for the method is a providing step S1, which involves providing the microscope 2 with the sample 4 on the sample carrier 6 in the embedding medium 8 or the cover glass 10. Afterward, in a step S2, sample information is acquired and input via the input device 26 of the control device 24. The sample information comprises at least one of the following indications: Thickness of the cover glass 10, material of the cover glass 10, temperature of the sample 4, type of the sample 4, location of the sample 4 on the sample carrier 6, type of the embedding medium 8 of the sample 4, type of the immersion medium 19.

Afterward, in an imaging step S3, the sample is imaged by the microscope 2, with the result that the control device 24 obtains a raw image of the sample from the detector 16. In this case, the correction ring 20 is set to a first setting.

In an input step S4, the raw image together with the sample information is input into a machine algorithm stored beforehand as a determining program e.g. in the control device 26. In a step S5, said machine algorithm determines a second, improved setting of the correction ring 20. Said setting is configured such that imaging aberrations are reduced compared with the first setting. The algorithm uses the raw image and the sample information for this purpose.

Figure 2:
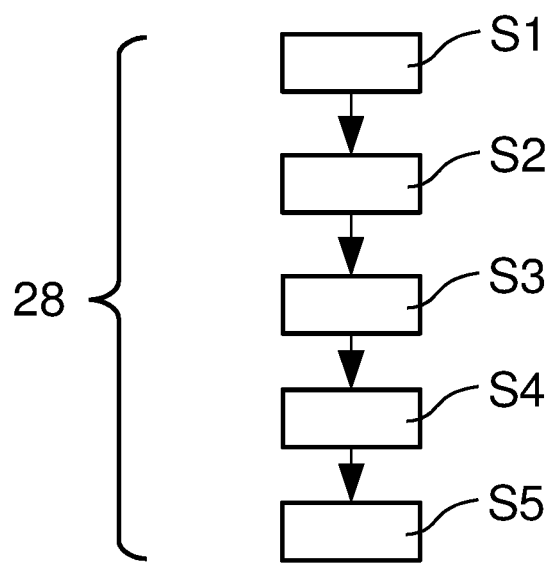
FIG. 2 shows a block diagram of a method for preparing the microscope by finding an improved or optimum setting of the objective correction ring.
Figure 4:
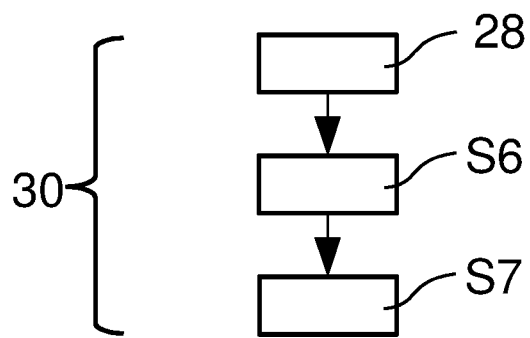
FIG. 4 shows a block diagram for illustrating a method for examining the sample by microscopy using a preparatory method in the embodiment in accordance with FIG. 2 or in some other embodiment.

FIG. 4 shows a microscopy method 30, wherein firstly the preparation method 28, for example in accordance with FIG. 2 is carried out, then in a step S6 the correction ring 20 is set to the second setting, and then in an imaging step S7 the sample 4 is imaged with this setting of the objective correction ring 20, with the result that overall a final image of the sample 4 with optimized image quality is obtained.

Figure 3:
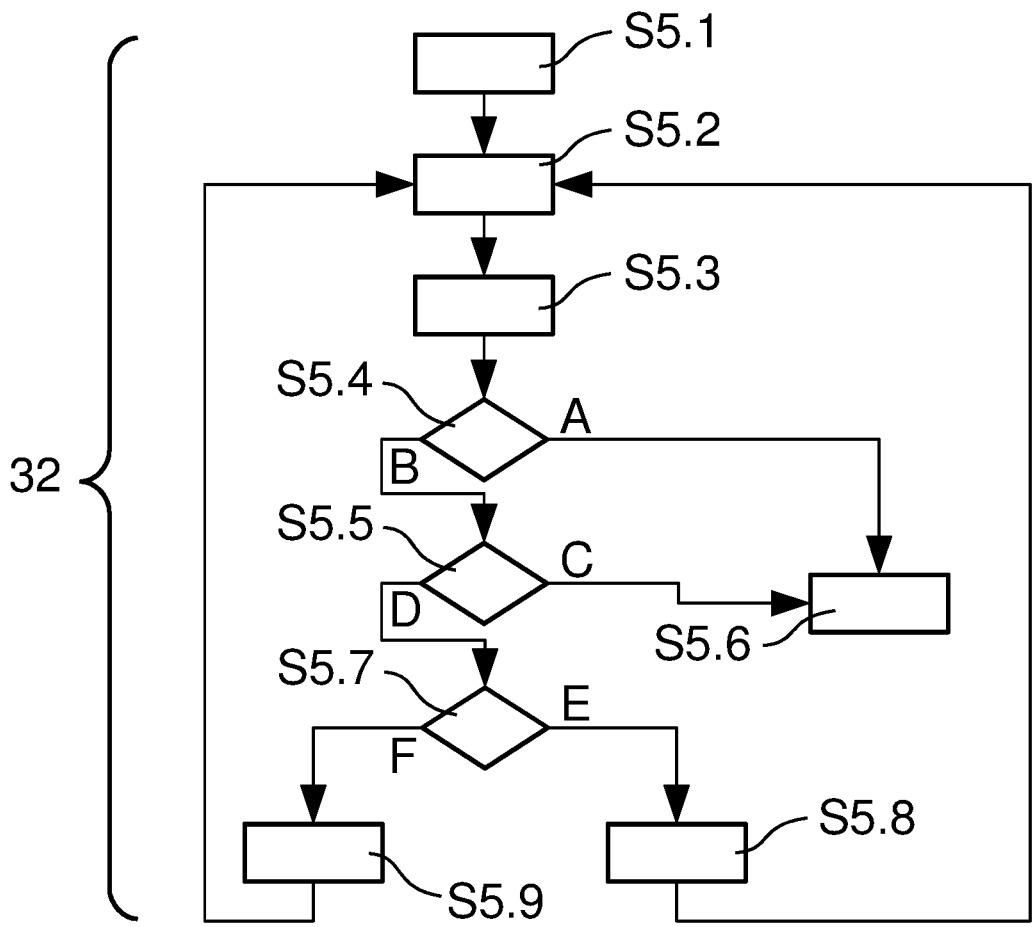
FIG. 3 shows a block diagram with substeps that can be carried out in a step from FIG. 2 in embodiments.

FIG. 3 shows one exemplary embodiment of the algorithm 32 from step S5, i.e. the configuration of the machine algorithm 32, which determines the second, improved setting of the correction ring 20 using the raw image and the sample information.

In a step S5.1, a figure of merit is determined for the raw image and the correction ring 20 is set to a changed setting. This examination of a correction ring 20 set in a changed manner can be performed either with regard to an imaging simulation or with regard to a real imaging of the sample. Firstly the variant of a real imaging of the sample is explained below. However, as will also become clear later, the principles outlined are also applicable to a simulated imaging and thus a simulated adjustment of the correction ring 20.

Afterward, in a step S5.2, the sample 4 is imaged with the changed setting of the correction ring 20 and a further raw image is thus obtained. Then, in a step S5.3, a figure of merit is determined for this changed raw image. Twofold checking then takes places. Firstly step S5.4 involves an interrogation as to whether a specific maximum number of iterations has been effected. This could also take place elsewhere in the sequence. For this purpose, upon each pass through step S5.3 or S5.2, a counter is increased, and the number of iterations in the interrogation in step S5.4 is compared with the maximum number of iterations. If said maximum number is exceeded, the method is ended and the last setting of the correction ring 20 is taken as the second setting. This is the branch "A" in step S5.4. By contrast, if the maximum number of iterations has not yet been reached, the method continues with the branch "B" to step S5.5, in which a check is made to ascertain whether the figure of merit determined last attained a minimum value. If this is the case, this figure of merit, as in the branch "A" of step S5.4, is output as the second setting in a step S5.6 (branch "C" of step S5.5.). By contrast, if the figure of merit determined last has not yet attained the minimum value, the method is continued with step S5.2 in a further iteration loop (branch "D").

In this case, however, a check is made beforehand in a step S5.7 to ascertain whether the last figure of merit is better than the previous one. If this is the case (branch "E" of step S5.7), in a step S8 the correction ring 20 is adjusted, specifically in the same direction in which it had been adjusted during the last adjustment. In other words, it is set further in step S5.8. By contrast, if the figure of merit of the last raw image is poorer than that of the penultimate one (branch "F" of step S5.7), in a step S5.9 the correction ring 20 is adjusted in the opposite direction. In both cases, the method then jumps back to step S5.2, that is to say that a further raw image of the sample is obtained for the most recently changed setting of the correction ring 20.

The iteration is ended in step S5.6 either if a predetermined number of iterations has been effected (interrogation in step S5.4) or if a minimum figure of merit has been attained (interrogation in step S5.5).

In the previously described embodiment of the algorithm 32, the sample was really imaged to form further raw images and the objective correction ring 20 was actually adjusted. This can be replaced by a simulation in which the adjustment of the correction ring 20 and the imaging of the sample 4 are simulated, for example using the known 2D or optionally 3D point spread function of the microscope 2. Such a point spread function (PSF) can be determined beforehand from the test measurements, as is known to the person skilled in the art. The use of a simulation has the advantage that the machine learning process that is carried out by the algorithm 32 in step S5 is accelerated and, in particular, the sample is not burdened by illumination radiation.

The exemplary embodiment of the algorithm 32 as described in the embodiment in FIG. 3 follows the principle of reinforcement learning. By virtue of the use of the figure of merit, the algorithm 32 independently determines the optimum correction ring setting and knowledge of internal relationships is not necessary. The figure of merit used can relate to specific image characteristics, for example image sharpness, signal/noise ratio, etc., as explained in the general part of the description. Equally, it is also possible to use a correspondingly trained neural network 34, which can optionally be provided in the control device 24 (therefore depicted by dashed lines in FIG. 1). The neural network 34 is trained to recognize good images and to output a figure of merit for the image quality. The better the image, the higher the figure of merit. The configuration and the training of such neural networks are known to the person skilled in the art.

In the embodiment of the machine-learned algorithm 32, the latter is based on supervised learning on the basis of training data provided. With these training data, a model is learned which maps an input x onto an output y. Models from so-called Deep Learning are preferably used, in particular so-called Convolutional Neural Networks (cf. https://de.wikipedia.org/wiki/Deep_Learning and https://de.wikipedia.org/wiki/Convolutional_Neural_Network). By way of example, depending on the input or output, the model can perform a classification of the setting of the correction ring 20, for example whether the setting is okay, not okay, too low or too high, and can then carry out a regression, if appropriate, in order to calculate an improved setting of the correction ring 20, e.g. the prediction of an optimum value or of an adjustment necessary therefor and/or an image synthesis or an image-to-image mapping, e.g. for generating a preview image, i.e. a new raw image of the sample 4 with a changed setting of the correction ring 20, or e.g. for generating an estimation of the 2D or 3D PSF of the imaging system of the microscope 2 before and/or after a change in the setting of the correction ring 20.

The input x can consist of the single image of the sample 4, a plurality of images of the sample (e.g. in order to find an average setting that is valid for a plurality of regions of the sample 4), z-stack images of the sample 4, a theoretical PSF of the imaging system of the microscope 2, and/or additional information, such as current setting of the correction ring 20, type and/or material of the sample carrier 6 and/or of the cover glass 10, any position on the sample carrier 6, the type of sample, the embedding medium of the sample, indications about the immersion liquid and/or the cover glass thickness, as already mentioned in the introduction. Furthermore, it is preferably possible to specify the refractive index of the materials. Combinations of the parameters mentioned can also form an input x. By way of example, it is possible to use an input x comprising the current settings of the correction ring 20, the raw image, the theoretical PSF of the imaging system of the microscope 2, the type of sample 4 and the refractive index of the immersion medium 19.

The output y of the model can have the following form, inter alia: an indication of whether the current setting of the correction ring 20 is correct, an improved setting of the correction ring 20, different settings of the correction ring 20 that are assigned to different z-decks in the sample 4, a figure of merit describing how good the old setting and/or the new setting of the correction ring 20 are/is, a prediction of how the raw image of the sample 4 would appear after a change in the setting of the correction ring 20 (so-called preview image), a prediction about a displacement of the sample 4 in the raw image that is caused by a changed setting of the correction ring 20, a prediction of the PSF of the imaging system of the microscope 2 following the application of a changed setting of the correction ring correction ring 20.

The method 28 for determining an improved or optimum setting of the correction ring 20 can be embedded into various workflows. Preference is given to an automatic initiation of the method after recognizing a change of sample and/or after recognizing a decrease in the image quality by a specific amount and/or after a change of objective. Preference is equally given to a manual initiation by a user.

The number of iterations carried out when determining the optimum setting of the correction ring 20 is at least two. A small number of iterations results in a fast determination of the second setting value, which is possibly not optimal, however.

The method 28 is optionally carried out once for different z-depths. Afterward, readjustment is automatically carried out according to the respective z-depth. The optimization can also be effected continuously as a control loop.

The interaction with the user can comprise a warning if the iteration was terminated without an optimum setting of the correction ring 20 being determined or if an optimum on the basis of the figure of merit is not attained or is not attained to a sufficient extent.

The invention claimed is:

1. A method for preparing an optical microscope for optically imaging a sample, comprising the following steps:
   a) providing the microscope for imaging the sample, wherein the microscope comprises an objective having an adjustable objective correction ring for correcting total imaging aberrations;
   b) optically imaging the sample through the objective and onto an image sensor of the optical microscope for generating at least one raw image of the sample, wherein the objective correction ring is at a first setting value during the imaging;
   c) inputting the at least one raw image of the sample into a machine-learned or machine learning algorithm;
   d) evaluating the optical image quality of the at least one raw image of the sample by means of the algorithm to determine a second relative or absolute setting value of the objective correction ring, which second setting value differs from the first setting value and reduces the total imaging aberrations vis à vis the first setting, by means of the algorithm; and
   e) adjusting the objective correction ring to the second setting value and providing the optical microscope for subsequent imaging of the sample through the objective and onto the image sensor.

2. The method as claimed in claim 1, wherein the algorithm is embodied as a machine learning algorithm and carries out the following substeps in step d):

f1) determining a figure of merit for the raw image and adjusting the objective correction ring to a changed setting value, either in a simulation or during renewed imaging of the sample, and also iteratively carrying out the following steps f2)-f5):
   f2) determining a further raw image of the sample for the changed setting of the objective correction ring;
   f3) generating a current figure of merit for the raw image of the sample determined in step f2);
   f4) checking whether the current figure of merit attained a minimum value, and ending the iteration using the last-determined setting value of the objective correction ring as the second setting if this is the case or a predefined number of iteration passes has been reached, otherwise continuing the iteration with step f5);
   f5) adjusting the objective correction ring in the same direction as during the last adjustment if the current figure of merit is better than the previous one, otherwise adjusting the objective correction ring in the opposite direction, and continuing the iteration with step f2).

3. The method as claimed in claim 2, wherein the figure of merit is based on an evaluation in accordance with a quality criterion comprising at least one of the following image properties: imaging sharpness; signal/noise ratio; presence, frequency or extent of predetermined artefacts; recognizability of predetermined structures.

4. The method as claimed in claim 1, wherein the algorithm comprises a neural network, which assesses image quality and/or determines the second setting value.

5. The method as claimed in claim 1, comprising acquiring sample information comprising at least one of the following indications: thickness of a cover glass, material of the cover glass, embedding medium of the sample, immersion medium, wherein in step d) the algorithm determines the second setting value on the basis of the sample information as well.

6. The method as claimed in claim 1, wherein the algorithm determines at least one provisional setting value of the objective correction ring in step d) and steps b) and c) are iterated with the at least one provisional setting value.

7. The method as claimed in claim 1, wherein in step d) the algorithm calculates a preview image from the at least one raw image and one the basis of the second setting value of the objective correction ring.

8. The method as claimed in claim 1, wherein a point spread function (PSF) is provided for the microscope and step d) comprises to evaluate the point spread function (PSF).

9. The method as claimed in claim 1, wherein the algorithm is carried out by a control device of the microscope and the objective correction ring is adjustable by motor and is set to the second setting by the control device.

10. A method for optically examining a sample by optical microscopy comprising the following steps:
    a) providing a microscope comprising an objective having an adjustable objective correction ring for correcting total imaging aberrations:
    b) optically imaging the sample through the objective and onto an image sensor of the optical microscope for generating at least one raw image of the sample wherein the objective correction ring is at a first setting value during the imaging;
    c) inputting the at least one raw image of the sample into a machine-learned or machine learning algorithm;

d) evaluating the optical image quality of the at least one raw image of the sample by means of the algorithm to determine a second relative or absolute setting value of the objective correction ring, which second setting value differs from the first setting value and reduces the total imaging aberrations vis à vis the first setting value, by means of the algorithm on the basis of the raw image; and e) subsequently imaging the sample to the image sensor through the objective while using the second setting value of the objective correction ring.

11. The method as claimed in claim 10, wherein the algorithm is embodied as a machine learning algorithm and carries out the following substeps in step d):

f1) determining a figure of merit for the raw image and adjusting the objective correction ring to a changed setting value, either in a simulation or during renewed imaging of the sample, and also iteratively carrying out the following steps f2)-f5):

f2) determining a further raw image of the sample for the changed setting of the objective correction ring;

3) generating a current figure of merit for the raw image of the sample determined in step f2);

f4) checking whether the current figure of merit attained a minimum value, and ending the iteration using the last-determined setting value of the objective correction ring as second setting value if this is the case or a predefined number of iteration passes has been reached, otherwise continuing the iteration with step f5);

f5) adjusting the objective correction ring in the same direction as during the last adjustment if the current figure of merit is better than the previous one, otherwise adjusting the objective correction ring in the opposite direction, and continuing the iteration with step f2).

12. The method as claimed in claim 11, wherein the figure of merit is based on an evaluation in accordance with a quality criterion comprising at least one of the following image properties: imaging sharpness; signal/noise ratio; presence, frequency or extent of predetermined artefacts; recognizability of predetermined structures.

13. The method as claimed in claim 10, wherein the algorithm comprises a neural network, which assesses image quality and/or determines the second setting value.

14. The method as claimed in claim 10, comprising acquiring sample information comprising at least one of the following indications: embedding medium of the sample, or immersion medium, wherein in step d) the algorithm determines the second setting value on the basis of the sample information as well.

15. The method as claimed in claim 10, wherein the algorithm determines at least one provisional setting value of the objective correction ring in step d) and steps b) and c) are iterated with the at least one provisional setting value.

16. The method as claimed in claim 10, wherein in step d) the algorithm calculates a preview image from the at least one raw image and on the basis of the second setting value of the objective correction ring.

17. The method as claimed in claim 10, wherein a point spread function (PSF) is provided for the microscope and wherein step d) comprises to evaluate the point spread function (PSF).

18. The method as claimed in claim 10, wherein the algorithm is carried out by a control device of the microscope and the objective correction ring is adjustable by motor and is set to the second setting value by the control device.

19. The method as claimed in claim 1, comprising acquiring sample information comprising at least one of the following indications: sample temperature, sample location on a sample carrier, wherein in step d) the algorithm determines the second setting value on the basis of the sample information as well.

20. The method as claimed in claim 10, comprising acquiring sample information comprising at least one of the following indications: sample temperature, sample location on a sample carrier, wherein in step d) the algorithm determines the second setting value.

* * * * *